Oct. 17, 1950  A. L. RICORDEL  2,525,945
BACKLASH TAKE-UP DEVICE
Filed Aug. 17, 1945  2 Sheets-Sheet 1
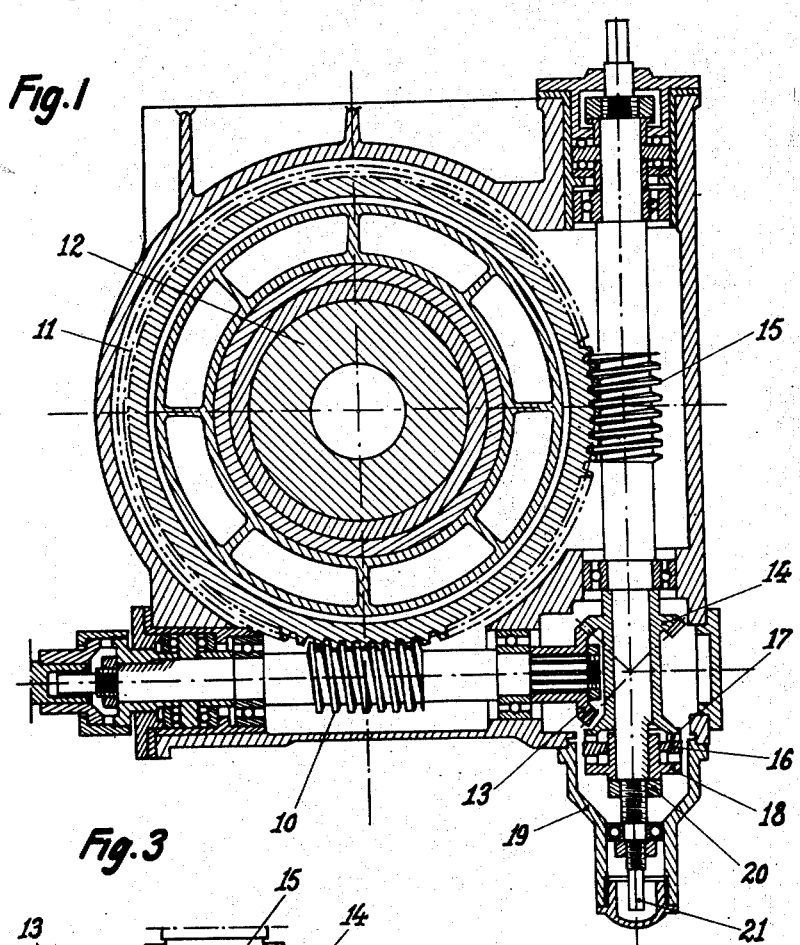
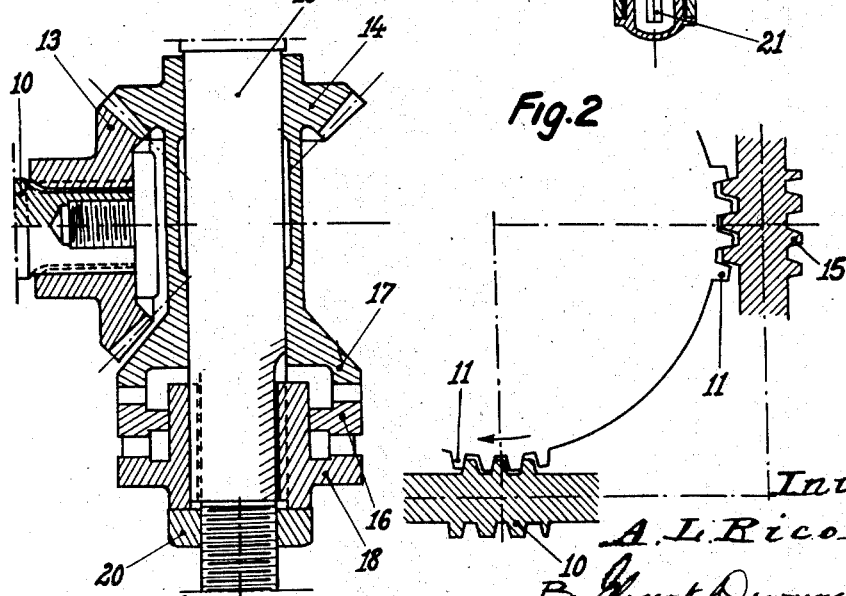
Inventor
A. L. Ricordel Oct. 17, 1950  A. L. RICORDEL  2,525,945
BACKLASH TAKE-UP DEVICE
Filed Aug. 17, 1945  2 Sheets-Sheet 2
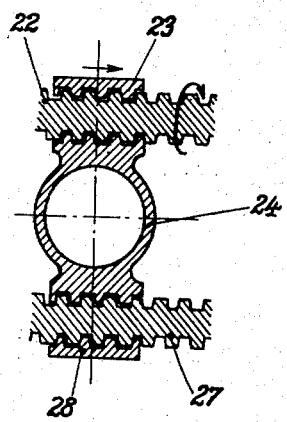
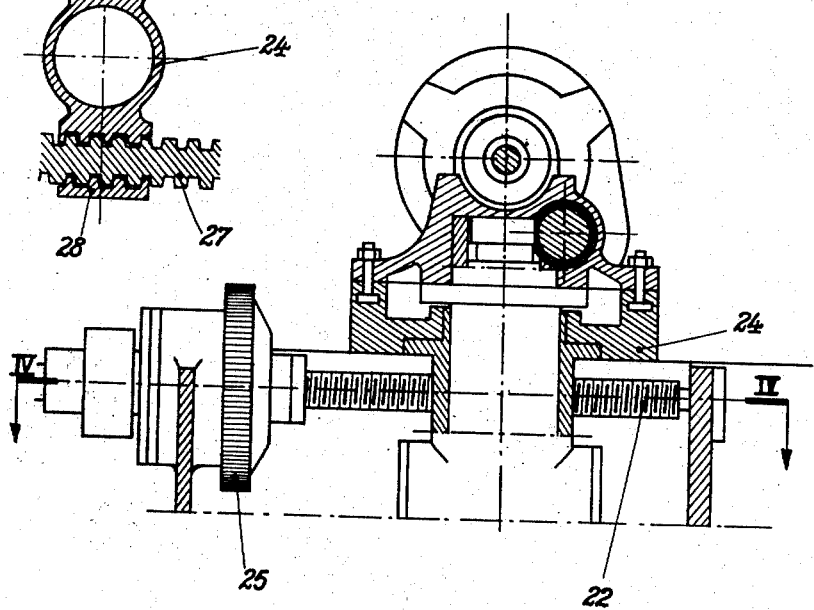
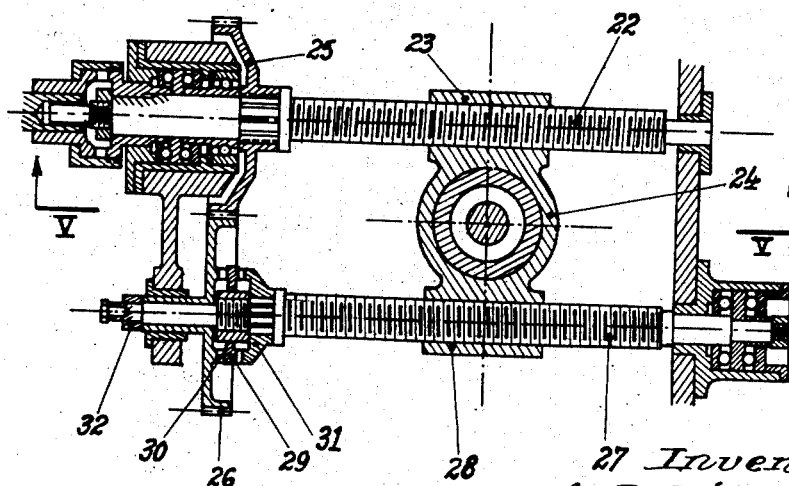
Inventor
A L Ricordel Patented Oct. 17, 1950

2,525,945

UNITED STATES PATENT OFFICE 2,525,945

BACKLASH TAKE-UP DEVICE

Auguste Louis Ricordel, Paris, France, assignor to Centre d'Etudes Techniques et d'Inventions, Paris, France, a company of France Application August 17, 1945, Serial No. 610,888
In France September 25, 1941

Section 1, Public Law 690, August 8, 1946
Patent expires September 25, 1961

5 Claims. (Cl. 74—409)

For eliminating the detrimental effect of the slack in a drive, between the driving and the driven member, it is already known to maintain the latter in contact with the motive surface of the driving member by means of a yielding pressure.

In the case of the drive of a helical wheel by an endless screw, or of a nut by a screw spindle in particular, the yielding pressure exerted upon the surface (opposed to that receiving the driving force) of the helical teeth or of the screw thread is obtained by means of a second endless screw or a second nut driven by the first through the means of a yielding link.

This system has the drawback that it is complicated and will cause continuous and important friction and wear. It could, however, render services in cases where the slack of the drive is continuously varying, as for instance, when the teeth or threads are not identical or when the wear is different from one tooth or thread to the other.

The object of the invention described below is a novel device for taking up the slack, particularly adapted for tooth and thread drives, especially for machines for cutting gears by means of a gear-wheel cutter, under the assumption, which is generally correct, that the teeth and threads and their wear are uniform, said device permitting, from time to other, by suitable adjustment, to take up the slack due to the wear. This device does not present the drawbacks indicated above.

The device according to the invention is characterised by the fact that the member for taking up the slack, similar to the driving member, and consisting for instance in an endless screw or a screw spindle, is positively driven by the driving member in order to remain in contact with the driven member and maintain contact at the driving point, and is connected to the driving member by an adjustable connection forming a vernier arrangement.

By way of example, there are described below and shown on the joined drawing two embodiments of said slack absorbing device applied to a gear-cutting machine fitted with a gear-wheel cutter.

Figures 1 to 3 refer to a dividing device drive by means of an endless screw and a helical wheel and show respectively:

Figure 1 a plan view, partially in section,

Figure 2, in diagrammatic section, an enlarged detail of the contacts of the driving endless screw and the endless screw used for taking up the slack with the helical wheel, and Figure 3, in axial section, the enlarged detail of the vernier connection between both screws.

Figures 4 to 6 relate to the gear-wheel cutter carrying carriage drive by means of a screw-spindle and corresponding nut, and are respectively:

Figure 4 a plan view, partially in section along the plane IV—IV of Figure 5,

Figure 5 a vertical section by the plane V—V of Figure 4, and

Figure 6 an enlarged diagrammatic section of the contacts of the driving and the slack absorbing screws with the carriage.

According to Figures 1 to 3, the plate 12 carrying the crude to be cut into a gear is integral with a helical wheel 11 driven by an endless screw 10. The slack absorbing member consists in another endless screw 15, also in mesh with the helical wheel 11 and driven by the driving endless screw 10 over the following adjustable connection: The driving screw 10 carries, at its end, a bevel pinion 13 meshing with a like bevel pinion 14 integral with a sleeve mounted freely upon the shaft of the slack absorbing endless screw 15. This sleeve, carrying the pinion 14, and the shaft carrying the endless screw 15 are coupled as follows: The sleeve is ended at the bottom by a toothed ring 17; the shaft of the endless screw 15 is integral with another toothed ring 18; between the two, and meshing with each of them, is a disc 16 toothed on both its sides. Upon tightening the nut 20, the pinion 14 is made integral with the endless screw 15 and both endless screws 10 and 15 will rotate at the same speed.

For eliminating any slack in the drive, it is necessary, as seen in Figure 2, that the driving flanks of the threads of the endless screw 10 and the driving flanks of the threads of the endless screw 15 rest against the opposedly directed flanks of the teeth of the helical wheel 11.

For obtaining this result, the parts 16—17 on one hand, and 16—18 on the other, connecting the two screws to one another, carry a large number of teeth differing from one another by a very small amount, as for instance 40 and 41, thus forming a sort of vernier permitting to adjust in rotation the position of screw 15 with respect to that of screw 10 in a very precise manner, and, consequently, to set up an exact contact of screw 15 and helical wheel 11, without any contact stress.

If, after having taken off the cap 19, the screw 15 is maintained in its position by means of its end square 21 and the nut 20 unscrewed, the intermediate disc 16 fitted with the double toothing may, after having slightly lowered the sleeve of the toothed ring 18 without freeing it from the shaft of screw 15, be rotated by one tooth, so that, when it is reset in mesh with the teeth 17 of the sleeve carrying the bevel pinion 14, the sleeve will have been rotated by $$\frac{1}{40 \times 41}$$

of a revolution, corresponding, if the pitch of screws 10 and 15 is 15 mm., to a slack absorption of $$15 \times \frac{1}{40 \times 41} = 0.009 \text{ mm}.$$

i. e. to about 1/100 mm. It is thus possible, leaving screw 10 fixed and in contact in the position of Figure 2, to rotate the screw 15 by successive amounts corresponding each to a slack absorption of 1/100 mm., and, consequently, bringing this screw too to the contact position shown in Figure 2.

When this adjustment has been effected, the threads of screw 15 will form, in operation, for the teeth of wheel 11, a stressless rest forcing said wheel to remain in contact with its driving screw 10.

In the slack absorbing device of Figures 4 to 6 concerning a drive of the carriage carrying the gear-wheel cutter, by means of a screw spindle, it is seen that the carriage 24 forms a nut 23 on the driving screw spindle 22. The slack absorbing device consists in a second screw spindle 27 of the same but opposite pitch, driven in the opposite direction by the two pinions 25 and 26, and for which the carriage 24 also forms a nut in 28. It is seen that, according to Figure 6, the slack will be absorbed when, the driving screw 22 contacting with the right side of thread 23, the control screw 27 will rest against the left side. The connection between the two screws comprises, as in the previous example, a vernier constituted by the disc 29 carrying on both its faces a large number of teeth, differing from one another by a small amount and adjustably meshing, on one hand, with teeth 30 integral with the pinion 26, and, on the other hand, with the teeth of the grooved sleeve 31 sliding upon the threaded spindle 27 with which it is integral in rotation.

The nut 32 screwed on the end of the screw spindle 27 fixes the three parts of this vernier connection to one another. If it is unscrewed while leaving the two drive pinions 25 and 26 in mesh, the vernier disc 29 may be rotated by one tooth and thereby the respective angular positions of the screws 22 and 27 exactly adjusted for setting up exact contact between the driving screw 22 and its nut 23 integral with the carriage carrying the gear cutter.

Having now particularly described and ascertained the nature of my said invention and the manner in which it is to be carried into practice, I declare that what I claim is:

1. In a backlash take-up device, particularly for gear-cutting machines comprising a driving worm, a driven element in mesh with said driving worm and a slack absorbing worm engaging said driven element, fine adjustment means comprising a toothed crown rotatably mounted on the slack-absorbing worm, a gear-connection between the driving worm and said toothed crown, a second toothed crown slidably but not rotatably mounted on the slack absorbing worm, a disc freely mounted on the slack absorbing worm, between the two toothed crowns, and having, on both sides, teeth adapted to engage the teeth of the two crowns and differing in number by only a very small amount, and means for axially pushing the second toothed crown and the disc so as to maintain said disc in mesh with the two crowns.

2. In a backlash take-up device, particularly for gear-cutting machines comprising a driving worm, a driven element in mesh with said driving worm and a slack absorbing worm engaging said driven element, fine adjustment means comprising a gear-wheel fixed on the driving worm, a sleeve rotatably mounted on the slack absorbing worm, a second gear-wheel fixed on said sleeve and in mesh with the gear-wheel of the driving worm, a toothed crown fixed on the same sleeve, a second sleeve slidably but not rotatably mounted on the slack absorbing worm, a second toothed crown fixed on said second sleeve, a disc, between the two crowns, freely mounted on the slack absorbing worm and having, on both sides, teeth adapted to engage the teeth of the two crowns and differing in number by only a very small amount, and means for axially pushing the second toothed crown and the disc so as to maintain said disc in mesh with the two crowns.

3. In a backlash take-up device, particularly for gear-cutting machines comprising a driving worm, a driven element in mesh with said driving worm and a slack absorbing worm engaging said driven element, fine adjustment means comprising a gear-wheel fixed on the driving worm, a sleeve rotatably mounted on the slack absorbing worm, a second gear-wheel fixed on said sleeve and in mesh with the gear-wheel of the driving worm, a toothed crown fixed on the same sleeve, second sleeve slidably but not rotatably mounted on the slack absorbing worm, a second toothed crown fixed on said second sleeve, a disc, between the two crowns, freely mounted on the slack-absorbing worm and having, on both sides, teeth adapted to engage the teeth of the two crowns and differing in number by only a very small amount, a thread on the slack absorbing worm, a nut screwed on said thread to squeeze the disc between the two toothed crowns, and a square terminal head.

4. In a backlash take-up device, particularly for gear-cutting machines comprising a driving worm, a helicoidal wheel in mesh with said driving worm and a slack absorbing worm perpendicular to the driving worm and engaging the helicoidal wheel, fine adjustment means comprising a bevel-wheel fixed on the driving worm, a sleeve rotatably mounted on the slack absorbing worm, a second bevel-wheel fixed on one end of said sleeve and in mesh with the first bevel-wheel, a toothed crown fixed on the other end of this sleeve, a second sleeve mounted on the slack absorbing worm and adapted to be axially displaced thereon, a second toothed crown integral with said second sleeve, a disc, between the two crowns, freely mounted on the second sleeve and having, on both sides, teeth adapted to engage the two toothed crowns and differing in number by only a very small amount, a thread on the slack absorbing worm, a nut screwed on said thread to squeeze the disc between the two toothed crowns, and a square terminal head.

5. In a backlash take-up device, particularly for gear-cutting machines comprising a driving worm, a carriage provided with two threaded holes, the one meshing with said driving worm, and a slack absorbing worm parallel with the driving worm and in mesh with the other threaded hole, fine adjustment means comprising a spur-gear fixed on the driving worm, a sleeve rotatably mounted on the slack absorbing worm, a second spur gear integral with said sleeve and in mesh with the spur-gear of the driving-worm, a toothed crown integral with the same sleeve, a second sleeve fixed on the slack absorbing worm, a second toothed-crown integral with said second sleeve, a disc, between the two crowns, freely mounted on the slack absorbing worm and having, on both sides, teeth adapted to engage the teeth of the two crowns and differing in number by only a very small amount, a thread on the slack absorbing worm, a nut screwed on said thread to squeeze the disc between the two toothed crowns, and a square terminal head.

AUGUSTE LOUIS RICORDEL.

REFERENCES CITED

The following references are of record in the file of this patent:

UNITED STATES PATENTS

| Number | Name | Date |
|---|---|---|
| 1,366,770 | Davis | Jan. 25, 1921 |
| 1,460,552 | Maag | July 3, 1923 |
| 1,472,848 | Maag | Nov. 6, 1923 |